United States Patent
Stadler et al.

(10) Patent No.: US 8,463,263 B2
(45) Date of Patent: Jun. 11, 2013

(54) METHOD FOR PROVIDING IDENTITY TO USER EQUIPMENT AND APPARATUS THEREOF

(75) Inventors: Thomas Stadler, Vienna (AT); Burghard Unteregger, Vienna (AT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 621 days.

(21) Appl. No.: 12/450,269

(22) PCT Filed: Mar. 17, 2008

(86) PCT No.: PCT/EP2008/053167
§ 371 (c)(1),
(2), (4) Date: Dec. 28, 2009

(87) PCT Pub. No.: WO2008/113787
PCT Pub. Date: Sep. 25, 2008

(65) Prior Publication Data
US 2010/0112992 A1    May 6, 2010

(30) Foreign Application Priority Data
Mar. 19, 2007  (EP) .................................... 07005615

(51) Int. Cl.
*H04W 4/00* (2009.01)
(52) U.S. Cl.
USPC ........ 455/435.1; 455/410; 455/411; 455/418; 370/328
(58) Field of Classification Search
USPC ........ 455/435.1, 410–411, 418–419; 370/328
See application file for complete search history.

(56) References Cited

U.S. PATENT DOCUMENTS
2010/0093386 A1*  4/2010  Damnjanovic et al. ....... 455/522

FOREIGN PATENT DOCUMENTS
EP            1119997 B1         3/2005

OTHER PUBLICATIONS

Search Report and Written Opinion in corresponding International Patent Application No. PCT/EP2008/053167 mailed Jul. 24, 2008.
English Translation of Chinese Office Action dated Dec. 23, 2011 issued in corresponding Chinese Patent Application No. 200880008819.5.
LG Electronics Inc., "Allocation of a "short" C-RNTI in message 2", 3GPP TSG-RAN Meeting #57 WG 2 LTE, R2-070886, Feb. 2007, pp. 1-2.
Nokia, "RACH Model", 3GPP TSG-RAN WG2 Meeting #57, R2-070453, Feb. 2007, pp. 1-6.

* cited by examiner

*Primary Examiner* — Marcos Torres
(74) *Attorney, Agent, or Firm* — Staas & Halsey LLP

(57) ABSTRACT

In a radio communications system, the identity of user equipment is provided upon receiving an access node a first message from at least one user equipment of a plurality of user equipment, where the first message includes information relating to the at least one user equipment. An identity for the at least one user equipment is generated by the access node based upon the information received. A second message that includes the identity is transmitted by the access node to the at least one user equipment, where a payload size for the identity is constant.

11 Claims, 5 Drawing Sheets

Proposed message 2 with Base C-RNTI according to the invention

| Information elements | Bits | Final CRNTI |
|---|---|---|
| Base C-RNTI | 16 | |
| Number of Signatures in msg2 | 6 | |
| Signature_1 | 6 | |
| Timing Advance_1 | TA | C-RNTI = BaseC-RNTI+0 |
| UL Resource Allocation_1 | UL-RA | |
| Signature_2 | 6 | |
| Timing Advance_2 | TA | C-RNTI = BaseC-RNTI+1 |
| UL Resource Allocation_2 | UL-RA | |
| Signature_N | 6 | |
| Timing Advance_N | TA | C-RNTI = BaseC-RNTI+ (N-1) |
| UL Resource Allocation_N | UL-RA | |
| Sum | 16+N*(6+TA+UL-RA)+6 | |

FIG 2

Example message 2 with full C-RNTI according to prior art

| Information elements | Bits | Final CRNTI |
|---|---|---|
| Number of Signatures in msg2 | 6 | |
| Signature_1 | 6 | C-RNTI = C-RNTI_1 |
| C-RNTI_1 | 16 | |
| Timing Advance_1 | TA | |
| UL Resource Allocation_1 | UL-RA | |
| Signature_2 | 6 | C-RNTI = C-RNTI_2 |
| C-RNTI_2 | 16 | |
| Timing Advance_2 | TA | |
| UL Resource Allocation_2 | UL-RA | |
| Signature_N | 6 | C-RNTI = C-RNTI_N |
| C-RNTI_N | 16 | |
| Timing Advance_N | TA | |
| UL Resource Allocation_N | UL-RA | |
| Sum | N*16+N*(6+TA+UL-RA)+6 | |

FIG 3

Example message 2 with short C-RNTI according to prior art

| Information elements | Bits | Final C-RNTI |
|---|---|---|
| Number of Signatures in msg2 | 6 | |
| Signature_1 | 6 | C-RNTI= C-RNTI0 + short C-RNTI_1 |
| Short C-RNTI_1 | 8 | |
| Timing Advance_1 | TA | |
| UL Resource Allocation_1 | UL-RA | |
| Signature_2 | 6 | C-RNTI= C-RNTI0 + short C-RNTI_2 |
| Short C-RNTI_2 | 8 | |
| Timing Advance_2 | TA | |
| UL Resource Allocation_2 | UL-RA | |
| Signature_N | 6 | C-RNTI= C-RNTI0 + short C-RNTI_N |
| Short C-RNTI_N | 8 | |
| Timing Advance_N | TA | |
| UL Resource Allocation_N | UL-RA | |
| Sum | N*8+N*(6+TA+UL-RA)+6 | |

FIG 6

Proposed message 2 with Base C-RNTI according to the invention

| Information elements | Bits | Final CRNTI |
|---|---|---|
| Base C-RNTI | 16 | |
| Number of Signatures in msg2 | 6 | |
| Signature_1 | 6 | C-RNTI = BaseC-RNTI + 0 |
| Timing Advance_1 | TA | |
| UL Resource Allocation_1 | UL-RA | |
| Signature_2 | 6 | C-RNTI = BaseC-RNTI + 1 |
| Timing Advance_2 | TA | |
| UL Resource Allocation_2 | UL-RA | |
| ... | ... | ... |
| Signature_N | 6 | C-RNTI = BaseC-RNTI + (N-1) |
| Timing Advance_N | TA | |
| UL Resource Allocation_N | UL-RA | |

Sum      16 + N*(6 + TA + UL-RA) + 6

METHOD FOR PROVIDING IDENTITY TO USER EQUIPMENT AND APPARATUS THEREOF

CROSS REFERENCE TO RELATED APPLICATIONS

This application is the U.S. national stage of International Application No. PCT/EP2008/053167, filed Mar. 17, 2008 and claims the benefit thereof. The International Application claims the benefits of European Application No. 07005615 filed on Mar. 19, 2007, both applications are incorporated by reference herein in their entirety.

BACKGROUND

Described below are a method and an apparatus for allocating an identity to user equipment (UE) during a random access procedure in a radio communications system.

For UEs 10 to transmit and receive messages in a radio communications system 1000, a UE 10 has to gain access to an access node 100, in order to be able to set up a connection with access node 100 and consequently access the internet, the PSTN (Public Switched Telephony Network) or other radio communications systems.

To gain access to access node 100, UE 10 has to execute a random access procedure. During the random access procedure, a UE 10 uses a RACH (random access channel) to transmit messages requesting radio resources.

In a random access procedure four messages are exchanged between UE 10 and an access node (AN) 100, as indicated in the UTRAN LTE (UMTS Terrestrial Radio Access Network Long Term Evolution) standard 36.300 v080. This can be seen in FIG. 1. In step 1, UE 10 transmits a random access preamble message to access node 100. In step 2, the access node 100 transmits a random access response message. In step 3, a scheduled transmission message is transmitted from UE 10 to access node 100, and in step 4 a contention resolution message is transmitted by access node 100.

During step 1, UE 10 transmits over the RACH a signature identifying itself to AN 100. This signature can be one out of 64 possible signatures.

During step 2, AN 100 transmits an assigned C-RTNI (Cell-Radio Network Temporary Identifier) identity for every signature that it has received in a certain time instant. This identity also includes other parameters, for example, a TA (Timing Advance) and a UL-RA (Uplink Resource Allocation) which are used by UE 10 for the transmission in step 3. The random access response message of step 2 is transmitted over a downlink shared channel (DLSCH) using fast retransmissions instead of HARQ (Hybrid Automatic Repeat Request). The identity used on the DLSCH is a RA-RNTI (Random Access-Radio Network Temporary Identifier) which is unique for a specific random access occasion and addresses all UEs 10 using the specific occasion. In this way, all UEs 10 know their corresponding RA-RNTI in advance and upon identifying it on the DLSCH, a UE 10 can then proceed with reading the received random access response message.

As a plurality of UEs 10 can use the RACH during the same time instant or occasion up to 64 different signatures can be received by AN 100 in a single time instant or occasion. This will result in a message transmitted in step 2 carrying up to 64 C-RNTI identities and parameters. Considering that the C-RTNI has a size of 16 bits, such a message can have a maximum size of 1024 bits (64*16 bits) for the C-RNTI payload. FIG. 2 provides a table showing the allocation of bits that include the C-RNTI payload.

FIG. 3, illustrates a table showing the allocation of bits of the C-RNTI payload, according to one solution, wherein the size of the C-RNTI payload is reduced. According to this solution, the C-RTNI payload is shortened for each signature and has a size of 8 bits. Considering that the C-RTNI has a size of 8 bits, such a message can have a maximum size of 512 bits (64*8 bits) for the C-RNTI payload. The final C-RTNI for each specific signature is obtained by combining the shortened C-RTNI with a base C-RTNI (C-RTNI0 in FIG. 3).

Both schemes described herein above it is also possible to split the message transmitted in step 2 in a number of messages transmitted within a certain time window or frame using the same RA-RTNI. This allows for a reduction in the size of the C-RTNI payload and consequently a reduction in the overall size of the message transmitted in step 2.

However, this has the disadvantage that UEs 10 awaiting such a message will have to read all such messages addressed by the RA-RNTI until they can find their respective transmitted signature. This will increase the waiting time that a UE 10 has to wait before it can then proceed with the random access procedure. Such a waiting delay or period can cause a UE 10 to loose the opportunity to gain access as during this waiting period another UE 10 can gain access.

In addition, further drawbacks are that in the event that the payload increases radio resources need to be allocated. This wastage of radio resources reduces the efficiency of the radio communications system as less radio resources are available for other uses. Furthermore, when transmitting messages without the use of HARQ, in order to ensure that messages can be received correctly at the edges of cells, higher order modulation is required. This increases the complexity of the access nodes and consequently the costs. In addition, the larger the payload size of the C-RTNI, increases the risk of errors being present and increases the probability of failed reception and consequently increases the number of re-transmissions to be performed in order for the messages to be correctly received. Such re-transmissions will cause a further the completion of the random access procedure.

A need therefore exists for a technique that overcomes the above mentioned drawbacks and ensures that a random access procedure is efficiently and that a user equipment can receive its identity in as short a time as possible completed. With the method described herein, the above mentioned problems are resolved. The proposed technique provides for an efficient and fast exchange of messages during a random access procedure.

SUMMARY

The method provides an identity to a user equipment in a radio communications system by.

BRIEF DESCRIPTION OF THE DRAWINGS

These and other aspects and advantages will become more apparent and more readily appreciated from the following description of the exemplary embodiments, taken in conjunction with the accompanying drawings of which:

FIGS. 2 and 3 are tables showing an allocation of bits for the payload of a message carrying a user equipment identity according to related art.

FIG. 6 is a table showing the allocation of bits according to the technique described herein.

DETAILED DESCRIPTION OF THE PREFERRED EMBODIMENT

Figure 1:
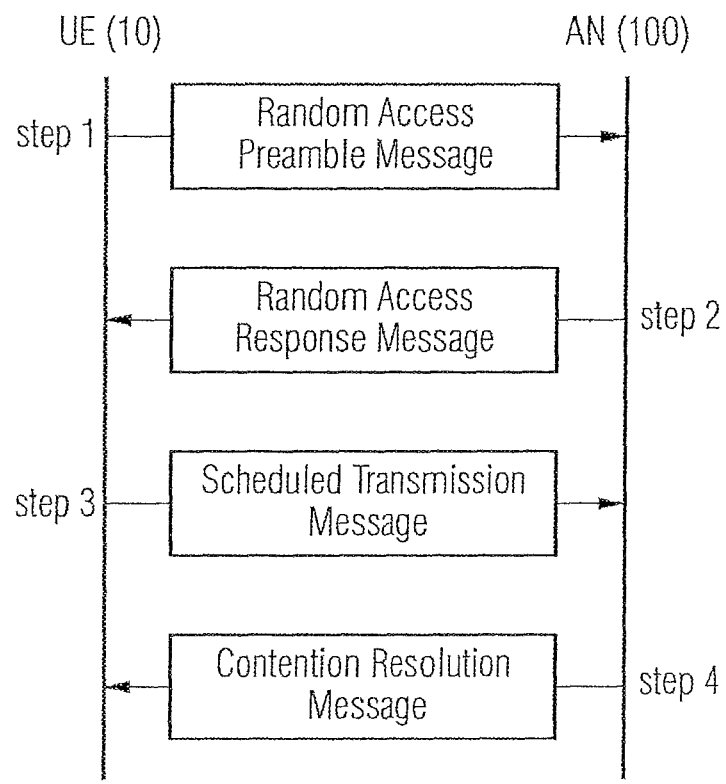
FIG. 1 is a message transmission diagram that depicts steps executed during a random access procedure.

Reference will now be made in detail to the preferred embodiments, examples of which are illustrated in the accompanying drawings, wherein like reference numerals refer to like elements throughout.

Figure 4:
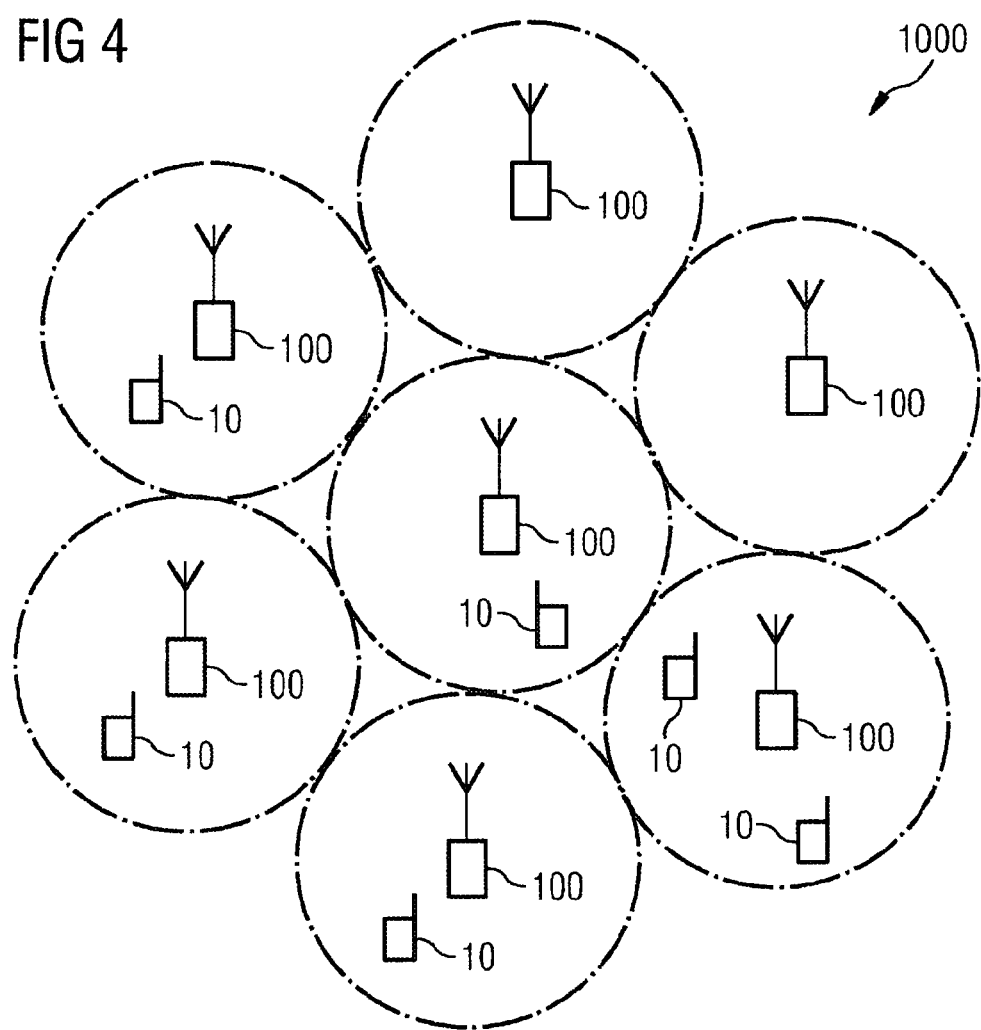
FIG. 4 is a block diagram that depicts a radio communications system wherein the technique described herein is applicable.

FIG. 4 depicts a radio communications system 1000 wherein the technique described herein is applicable. Radio communications system 1000 comprises of a plurality of UEs 10 and a plurality of ANs 100, each AN 100 controlling an area of the radio communications system 1000 known as a cell. UEs 10 can be at least one of the following: a mobile/cellular phone, a portable computer, a wireless device. ANs 100 can be at least one of the following: a BS (Base Station), a nodeB, an e-nodeB (e-nB), a RNC (radio network controller), a BSC (base station controller).

Radio communications system 1000 allows UEs 10, to connect via ANs 100, and access the internet, the PSTN (Public Switched Telephony Network) or other radio communications systems. Radio communications system 1000 can use at least one of the following technologies: 2G ($2^{nd}$ Generation Wireless Telephone Technologies) such as GSM (Global System for Mobile Communications), GPRS (General Packet Radio Service), EDGE (Enhanced Data rates for GSM Evolution), 3G ($3^{rd}$ Generation Mobile Phone Technologies) such as UMTS (Universal Mobile Telecommunications System), W-CDMA (Wideband Code Division Multiple Access), UTRAN LTE (UMTS Terrestrial Radio Access Network Long Term Evolution), 4G ($4^{th}$ Generation Wireless Telephone Technologies) such as WiMAX (Worldwide Interoperability for Microwave Access). As mentioned herein above, when a UE 10 wishes to communicate with an AN 100, it will execute a random access procedure in order to gain access and have radio resources allocated to it.

Figure 5:
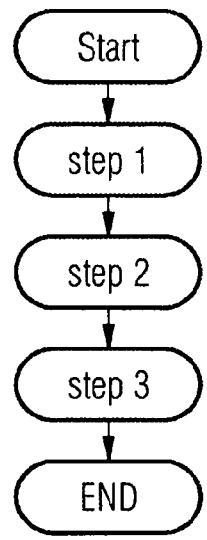
FIG. 5 is a flow chart showing the steps of the technique described herein.

FIG. 5 shows the steps performed by the technique. In step 1, AN 100 receives a first message transmitted from at least one UE 10. The first message is transmitted over a random access channel (RACH). The first message comprises of information relating to the at least one user equipment (10). This information can be in the form of a signature. In step 2, AN 100, generates an identity for the at least one UE 10 using the information received. This identity can be a cell specific identity such as a C-RTNI (Cell-Radio Network Temporary Identifier). In step 3, AN 100 transmits a second message comprising the identity. The second message can also comprise of further parameters necessary to the UE 10 for future messages sent to AN 100. These further parameters can comprise of at least one of the following: a timing advance (TA), an uplink resource allocation (UL-RA). The second message can be transmitted over a downlink shared channel (DLSCH).

The technique described herein can be implemented in an AN 100 arranged to perform the method. The technique described herein can be implemented in a number of ways known to the skilled person in the art, for example using a microcomputer or an integrated circuit board.

According to the technique described herein, AN 100 will generate the second message having a single full 16 bit C-RNTI, the base C-RTNI. The further parameters, such as those described herein above, are placed within a list entry for each signature. The offset of the signature within this list is added to the base C-RNTI to get the final C-RNTI for a specific signature. The payload size for the identities of the C-RNTI is thus constant, having a value of 16 bits. This can be seen in FIG. 6 where a table showing the allocation of bits comprising the C-RNTI payload transmitted in step 2 of the random access procedure, according to the technique described herein, is depicted, wherein the size of the C-RNTI payload is reduced compared with the current solutions available but still remains constant having a payload size of 16 bits.

According to the technique described herein, the C-RNTI payload is reduced by having a single full 16 bit C-RNTI thus avoiding radio resources being wasted and also avoiding the need to split the message and thus increase the time a UE 10 has to wait while checking for its signature. AN 100 generates the second message wherein an un-fragmented C-RNTI space is available for all the identities that are going to be transmitted. The C-RNTIs that are placed within the second message are placed consecutively within one second message.

The 16 bit C-RNTI space is big enough to provide the required flexibility when providing identities. Additionally, during hand over a full C-RNTI is assigned to the arriving UE 10 and C-RNTI re-assignments for security reasons which give the AN 100 enough opportunities to continuously maintain a de-fragmented C-RNTI space large enough for the purpose. Also the technique described herein provides for a gain in the number of bits. For example if 10 UEs 10 try to access the RACH, instead of having 160 bits allocated for the C-RNTI with the technique described herein only 16 are needed, thus providing for a gain of 144 bits.

In the event that there is not enough un-fragmented C-RNTI space available, the technique described herein is flexible enough in that it can still allow to split the second message and use 2 or more such messages with different Base C-RNTIs.

In a further refinement of the technique described herein, in order to overcome the C-RNTI space fragmentation in a more flexible way, in case a situation arises that requires fragmentation; two versions of the second message can be generated. One to be used as a first choice message and the second as a fallback message. Using a flag having a 1 bit size set by AN 100 at the beginning of the second message, the second message can indicate to a UE 10 which version is used. The first version of the message uses the proposed technique described herein providing full optimisation while the second version would use solution A as a fallback solution. In this way it is still possible to provide the identities to UEs 10 until enough un-fragmented space is again available at a later point in time, to use only the solution.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

Although embodiments and refinements are described herein, those skilled in the art will appreciate other embodiments and modifications can be made without departing from the scope of the teachings of the invention. All such modifications are intended to be included within the scope of the claims appended hereto which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for providing an identity to user equipment in a radio communications system, comprising:
   receiving, by an access node, a first message from at least one user equipment of a plurality of user equipments, the first message including information relating to the at least one user equipment in a form of a signature;
   generating an identity for the at least one user equipment by the access node based upon the information received in the first message;
   transmitting, by the access node, to the plurality of user equipments a second message in a form of a list, the list including the identity and all signatures received by the access node; and
   generating, by each user equipment of the plurality of user equipments, an individual identity by adding an offset of a respective signature within the list to the transmitted identity.

2. A method according to claim 1, wherein the second message includes further parameters required by the at least one user equipment.

3. A method according to claim 1, wherein the identity is a Cell-Radio Network Temporary Identifier.

4. An access node to provide an identity to at least one of a plurality of user equipments in a radio communications system, comprising:
   an interface to receive a first message from at least one user equipment of the plurality of user equipments, the first message including information relating to the at least one user equipment in a form of a signature;
   generation means to generate an identity for the at least one user equipment based upon the information received in the first message;
   a transmitter to transmit to the plurality of user equipments a second message in a form of a list, the list including the identity and all signatures received by the access node; and
   a generating means to generate, by each user equipment of the plurality of user equipments, an individual identity by adding an offset of a respective signature within the list to the transmitted identity.

5. An access node according to claim 4, wherein the access node is at least one of a base station, a nodeB, an e-nodeB, a radio network controller and a base station controller.

6. An access node according to claim 4, wherein the second message includes further parameters required by the at least one user equipment.

7. An access node according to claim 4, wherein the identity is a Cell-Radio Network Temporary Identifier.

8. A radio communications system providing an identity to at least one of a plurality of user equipments, comprising:
   at least one access node:
      receiving a first message from at least one user equipment of the plurality of user equipments, the first message including information relating to the at least one user equipment in a form of a signature,
      generating an identity for the at least one user equipment based upon the information received,
      transmitting, to the plurality of user equipments a second message in a form of a list, the list including the identity and all signatures received by the at least one access node, and
      generating, by each user equipment of the plurality of user equipments, an individual identity by adding an offset of a respective signature within the list to the transmitted identity.

9. A radio communications system according to claim 8, wherein the access node is at least one of a base station, a nodeB, an e-nodeB, a radio network controller and a base station controller.

10. A radio communications system according to claim 8, wherein the second message includes further parameters required by the at least one user equipment.

11. A radio communications system according to claim 8, wherein the identity is a Cell-Radio Network Temporary Identifier.

* * * * *